US009010761B2

(12) United States Patent
Deutsch et al.

(10) Patent No.: US 9,010,761 B2
(45) Date of Patent: Apr. 21, 2015

(54) REDUNDANT SEAL APPARATUS AND METHOD

(71) Applicant: Canrig Drilling Technology Ltd., Houston, TX (US)

(72) Inventors: Eric Deutsch, Katy, TX (US); Michael Macklin, Tomball, TX (US); Beat Kuttel, Spring, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 273 days.

(21) Appl. No.: 13/665,332

(22) Filed: Oct. 31, 2012

(65) Prior Publication Data

US 2014/0117623 A1 May 1, 2014

(51) Int. Cl.
*F16J 15/32* (2006.01)
*F16J 15/00* (2006.01)

(52) U.S. Cl.
CPC ........ *F16J 15/3216* (2013.01); *Y10T 29/49826* (2015.01); *F16J 15/008* (2013.01)

(58) Field of Classification Search
CPC .............................. F16J 15/3216; F16J 15/008
USPC .......................... 277/549, 551, 569, 571, 572
See application file for complete search history.

(56) References Cited

U.S. PATENT DOCUMENTS

| | | | |
|---|---|---|---|
| 3,773,336 A * | 11/1973 | Walter et al. | 277/551 |
| 4,327,895 A | 5/1982 | Blumenkranz et al. | |
| 4,972,986 A | 11/1990 | Lipschitz | |
| 5,199,748 A | 4/1993 | Jung et al. | |
| 5,666,012 A | 9/1997 | Gongwer | |
| 5,690,183 A | 11/1997 | Sollami | |
| 5,957,508 A | 9/1999 | Rief et al. | |
| 6,098,990 A * | 8/2000 | Marnot | 277/551 |
| 6,227,547 B1 | 5/2001 | Dietle et al. | |
| 7,059,608 B2 * | 6/2006 | Ramsay | 277/551 |
| 7,354,046 B2 * | 4/2008 | Ramsay | 277/551 |
| 7,866,382 B2 | 1/2011 | Williams | |
| 7,988,364 B2 | 8/2011 | Versteegh et al. | |
| 2003/0173746 A1* | 9/2003 | Ramsay | 277/549 |
| 2004/0247217 A1 | 12/2004 | Konruff et al. | |
| 2011/0012314 A1 | 1/2011 | Nakamura | |

FOREIGN PATENT DOCUMENTS

| | | |
|---|---|---|
| CN | 101776150 | 7/2010 |
| EP | 0850374 B1 | 5/2004 |
| EP | 1445500 B1 | 4/2007 |
| GB | 2417765 A | 3/2006 |
| JP | 2001355645 | 12/2001 |
| JP | 2007-46581 | 2/2007 |
| WO | WO 2007-125358 | 11/2007 |

OTHER PUBLICATIONS

International Search Report and Written Opinion issued for PCT/US2013/065425 dated Feb. 11, 2014, 27 pgs.

* cited by examiner

*Primary Examiner* — Gilbert Lee
(74) *Attorney, Agent, or Firm* — Haynes and Boone, LLP (57) ABSTRACT

An apparatus includes a rotatable shaft having a shaft surface and a first seal disposed in a sealing engagement with the shaft surface. At least a second seal is disposed in a first position relative to the rotatable shaft where the second seal is not in sealing engagement with the shaft surface and is movable to a second position relative to the rotatable shaft where the second seal is in sealing engagement with the shaft surface.

43 Claims, 6 Drawing Sheets

REDUNDANT SEAL APPARATUS AND METHOD

BACKGROUND OF THE DISCLOSURE

Break-downs and repairs of critical machinery in an oilfield and other seal-requiring operations process can result in inefficient operation, loss of operating time, increased operating expenses, and potentially loss of revenue. Even scheduled, routine maintenance of machinery, including replacement of worn components, results loss of time and increased operating expenses. For example, rotary seals used to seal around drive shafts in top drive drilling systems or casing systems, may become worn and may require replacement during the life of the top drive. In conventional systems, accessing and removing seals can be a time-consuming process and in some instances, may require substantial disassembly of the top drive or associated equipment. This results in the downtime and inefficiencies discussed above. For example, it may take up to about 15 hours to replace a rotary seal in a lower housing associated with a top drive because it may be necessary to first remove other components of the top drive, such as a pipe handler and a gear case, for example.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2-1 is a sectional view of an apparatus according to one or more aspects of the present disclosure.

FIG. 4 is a sectional view of an apparatus according to one or more aspects of the present disclosure.

FIG. 4-1 is a sectional view of an apparatus according to one or more aspects of the present disclosure.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

This disclosure provides apparatuses, systems, and methods for efficient replacement of a rotary seal with relatively little effort, resulting in decreased down-time and more cost effective system operation compared to conventional systems that require disassembly and physical swapping of a worn seal with a new one. In one aspect, these advantages can be obtained by using a redundant seal stored within the machinery, which is moved into sealing engagement from a non-sealing position, and thus from a non-wearing position to a sealing position without accessing and physically swapping out the worn seal. Accordingly, while a first seal is sealingly engaged with a rotating shaft, a second redundant seal is maintained in a reserved position until the first seal is worn. The second redundant seal can then be moved into sealing engagement when necessary, or when desired, such as in accordance with a maintenance time-table or detection of a leak. In one aspect of the disclosure, the apparatus is any device that requires replacement of a seal during operational life of the equipment, such as a handheld drill, tunnel boring equipment, oilfield-based equipment such as those including top drives, a power plant or jet turbine, or an engine or motor. The apparatus is further discussed below in connection with oilfield-based equipment, but the redundant seal apparatus of this disclosure may have applicability to a wide array of fields including those noted above.

Figure 1:
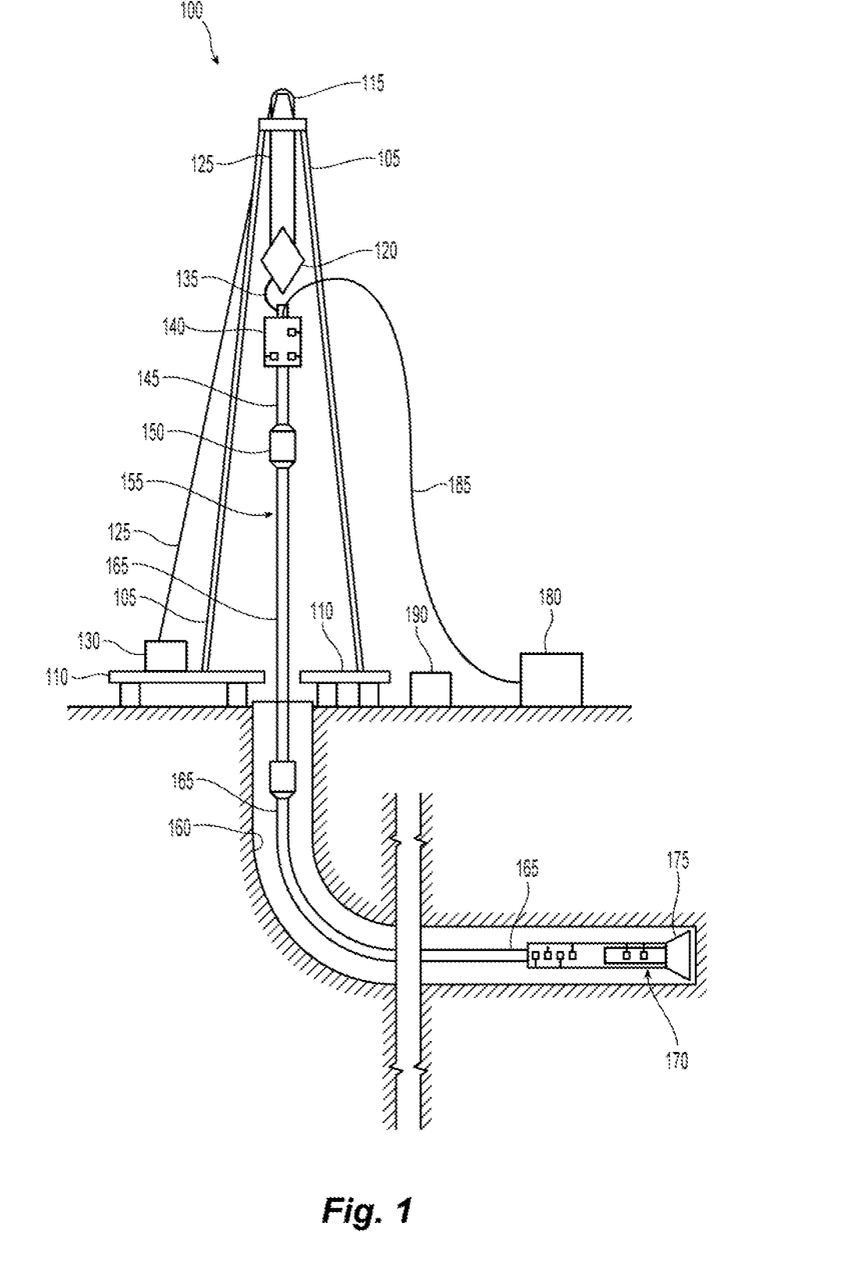
FIG. 1 is a schematic of an apparatus according to one or more aspects of the present disclosure.

Referring to FIG. 1, illustrated is a schematic view of an apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to drawworks 130, which is configured to reel out and reel in the drilling line 125 to cause the traveling block 120 to be lowered and raised relative to the rig floor 110. The other end of the drilling line 125, known as a dead line anchor, is anchored to a fixed position, possibly near the drawworks 130 or elsewhere on the rig.

A hook 135 is attached to the bottom of the traveling block 120. A top drive 140 is suspended from the hook 135. A quill 145 extending from the top drive 140 is attached to a saver sub 150, which is attached to a drill string 155 suspended within a wellbore 160. Alternatively, the quill 145 may be attached to the drill string 155 directly.

The drill string 155 includes interconnected sections of drill pipe 165, a bottom hole assembly (BHA) 170, and a drill bit 175. The bottom hole assembly 170 may include stabilizers, drill collars, and/or measurement-while-drilling (MWD) or wireline conveyed instruments, among other components. The drill bit 175, which may also be referred to herein as a tool, is connected to the bottom of the BHA 170 or is otherwise attached to the drill string 155. One or more pumps 180 may deliver drilling fluid to the drill string 155 through a hose or other conduit 185, which may be connected to the top drive 140.

In the exemplary embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100.

Figure 2:
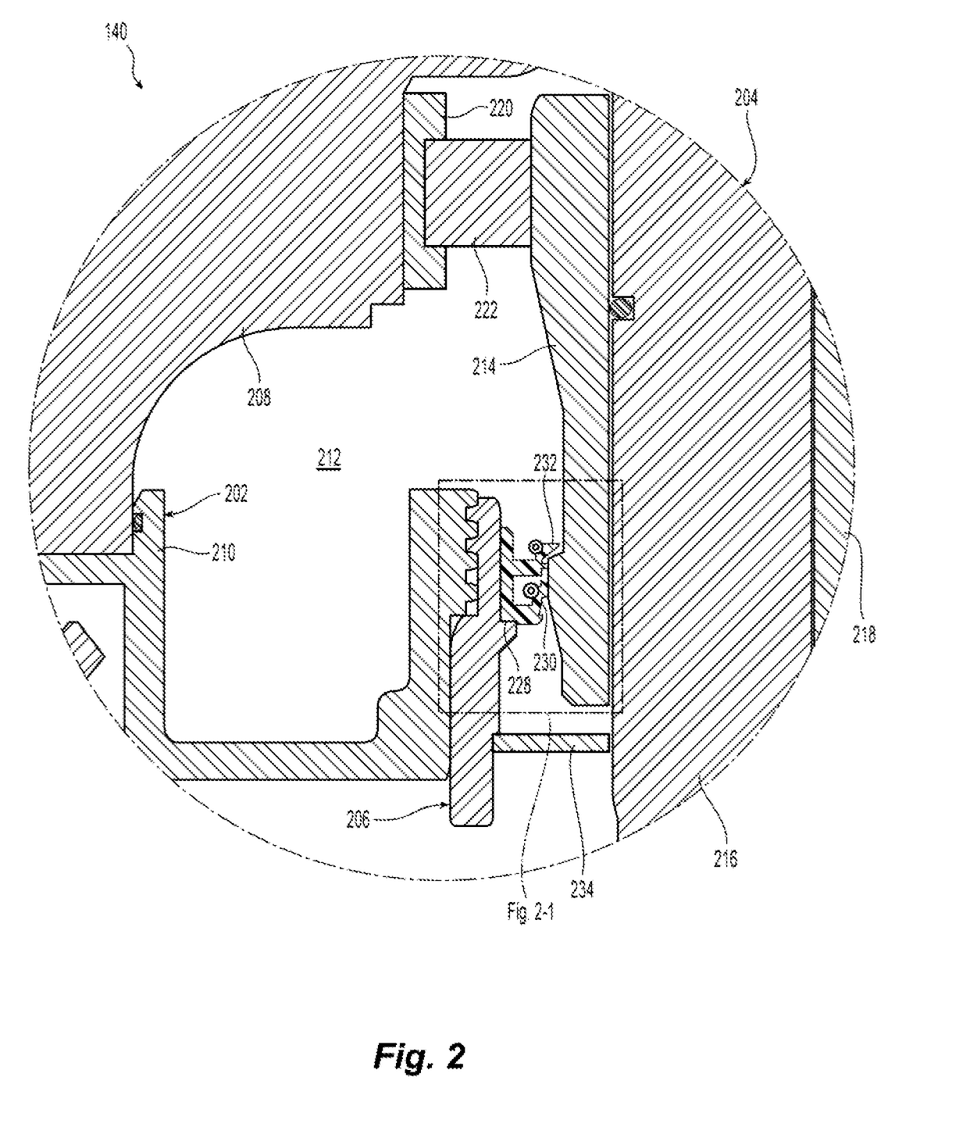
FIG. 2 is a sectional view of an apparatus according to one or more aspects of the present disclosure.

FIG. 2 is a cross-sectional view of a portion of the top drive 140. Referring to FIG. 2, the top drive 140 includes a housing 202, a rotary shaft 204 extending through the housing 202, and a seal carrier 206 disposed between the housing 202 and the rotary shaft 204.

The housing 202 includes a housing main body 208 and a housing lower body 210 shown as a sump connected to the main body 208. Together, the housing main body 208 and a housing lower body 210 form a protected or enclosed chamber 212. In some embodiments, the enclosed chamber 212 contains a fluid, such as a liquid or gas. In one example, the chamber 212 includes one or more lubricating oils that may be used to lubricate the top drive 140. The term "enclosed chamber" is intended to include protective chambers that are not necessarily fluidically sealed. For example, some enclosed chambers include breathers or other openings, while other enclosed chambers are sealed chambers.

The rotary shaft 204 connects with and drives the quill 145 (FIG. 1), which in turn drives the drill string 165. In this embodiment, the rotary shaft 204 includes a wear ring 214, a spindle as a hollow main shaft 216 within the wear ring 214, and a portion of the quill 145 referred to here as a driving shaft 218 within the main shaft 216. An outer bearing race 220 and a cylindrical roller 222 help maintain the housing 202 about the rotary shaft 204.

The depicted seal carrier 206 is disposed between the housing 202 and the rotary shaft 204 and includes a seal seat 228 and a plurality of seals that seal between the rotary shaft 204 and the housing 202. That is, the seals cooperate with the rotary shaft 204 to reduce or prevent the introduction of contaminants from the outside environment into the chamber 212 and/or to reduce or prevent leakage or loss of fluid from the chamber 212. In the example shown in FIG. 2, the seal carrier 206 carries two rotary seals, referred to herein as an originally engaging seal 230 and as a redundant seal 232. A splashguard 234 is also carried on the seal carrier 206 in FIG. 2.

As described in detail below, the seal carrier 206 may be moved or displaced axially along the rotary shaft 204 to move the redundant seal 232 from a position where it is not in sealing engagement with the rotary shaft 204 to a position where it is in sealing engagement with the rotary shaft 204.

Figure 21:
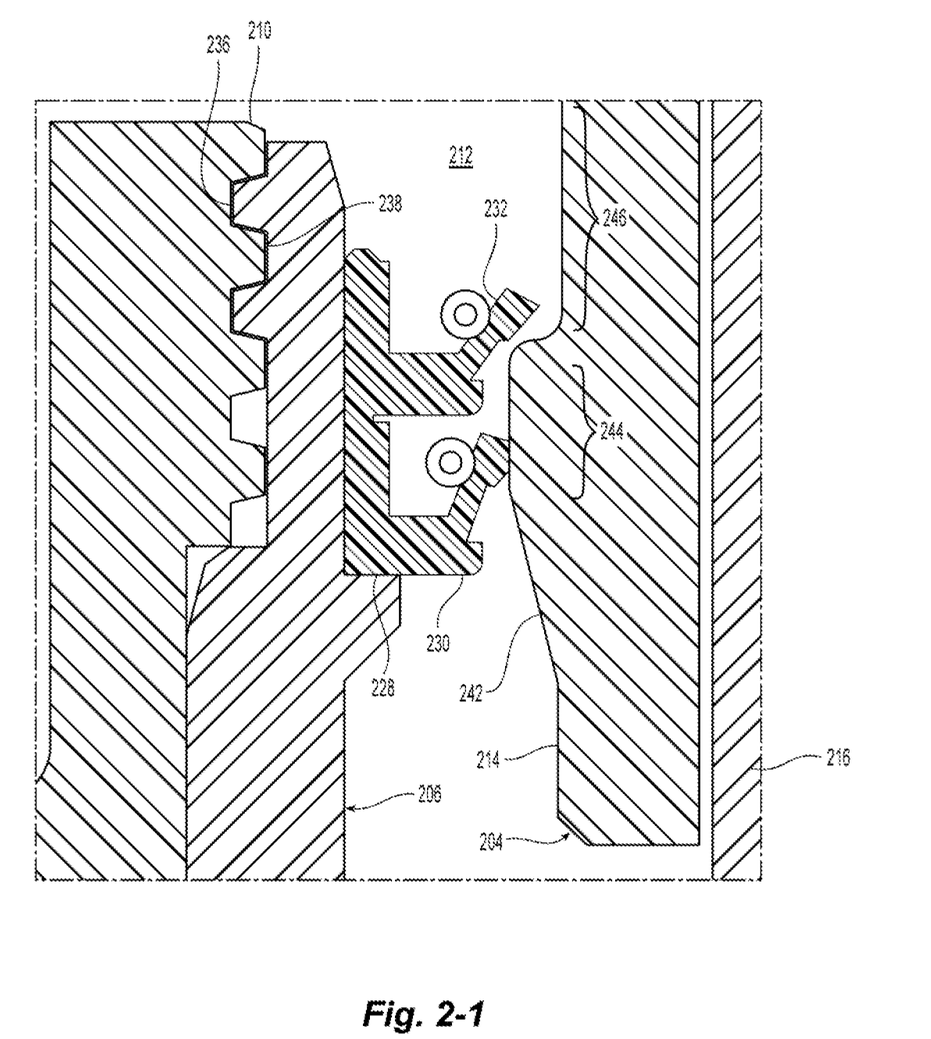

FIG. 2-1 shows a more detailed view of the cut-out 2-1 identified in FIG. 2. FIG. 2-1 shows the seal carrier 206 with the originally engaging seal 230 and the redundant seal 232, the housing lower body 210, and the wear ring 214 adjacent the main shaft 216. In this embodiment, the seal carrier 206 includes displacement elements disclosed as threads 236 engaged with corresponding displacement elements disclosed as threads 238 on the housing lower body 210. Accordingly, rotation of the seal carrier 206 about the rotary shaft 204 results in threaded axial displacement of the seal carrier 206 relative to the housing lower body 210 and the wear ring 214 of the rotary shaft 204.

Here, the wear ring 214 of the rotary shaft 204 includes an outer surface 242 that changes diameter along its axial length. This taper feature may assist during installation of seals to prevent them from rolling inside-out. For example, the wear ring 214 includes a sealing region 244 having a first diameter, and a reserve region 246 axially displaced from the sealing region 244 having a second diameter. The second diameter may be different than the first diameter, for example, it may be a smaller diameter as depicted to help avoid premature contact of the redundant seal 232 and the rotary shaft 204 until being moved into position for sealing engagement.

As shown in FIG. 2-1, the originally engaging seal 230 is sealingly engaged with the sealing region 244 of the wear ring 214, and the redundant seal 232 is aligned with the reserve region 246 of the wear ring 214. Because the reserve region 246 of the wear ring 214 has a diameter different than that of the sealing region 244, the redundant seal 232 is not engaged with the wear ring 214. Accordingly, even during rotation of the rotary shaft 204, the redundant seal 232 is preserved from wear. The redundant seal 232 is maintained within the enclosed chamber 212, protecting it from exposure to the outside environment. As such, the redundant seal 232 along with any additional redundant seals (not depicted) can be kept in a like-new condition for extended periods of time until desired. As can be seen, in this example, the originally engaging seal 230 and the redundant seal 232 are the same type of rotary lip seals and have the same diameters. Accordingly, in FIG. 2, the originally engaging seal 230 seal provides the sealing function about the wear ring 214, sealing the enclosed chamber 212 of the housing lower body 210 from contamination from exterior sources, such as the outside environment. Although described as having seals of the same size and type, other embodiments use seals of different sizes and/or different types.

In the embodiment shown, the originally engaging seal 230 and the redundant seal 232 are both ring-like seals having a radially-intermediate portion that is hollow. In this example, each of the originally engaging seal 230 and the redundant seal 232 include a lip extending from the hollow radially-intermediate portion. Other seal types are also contemplated.

Figure 3:
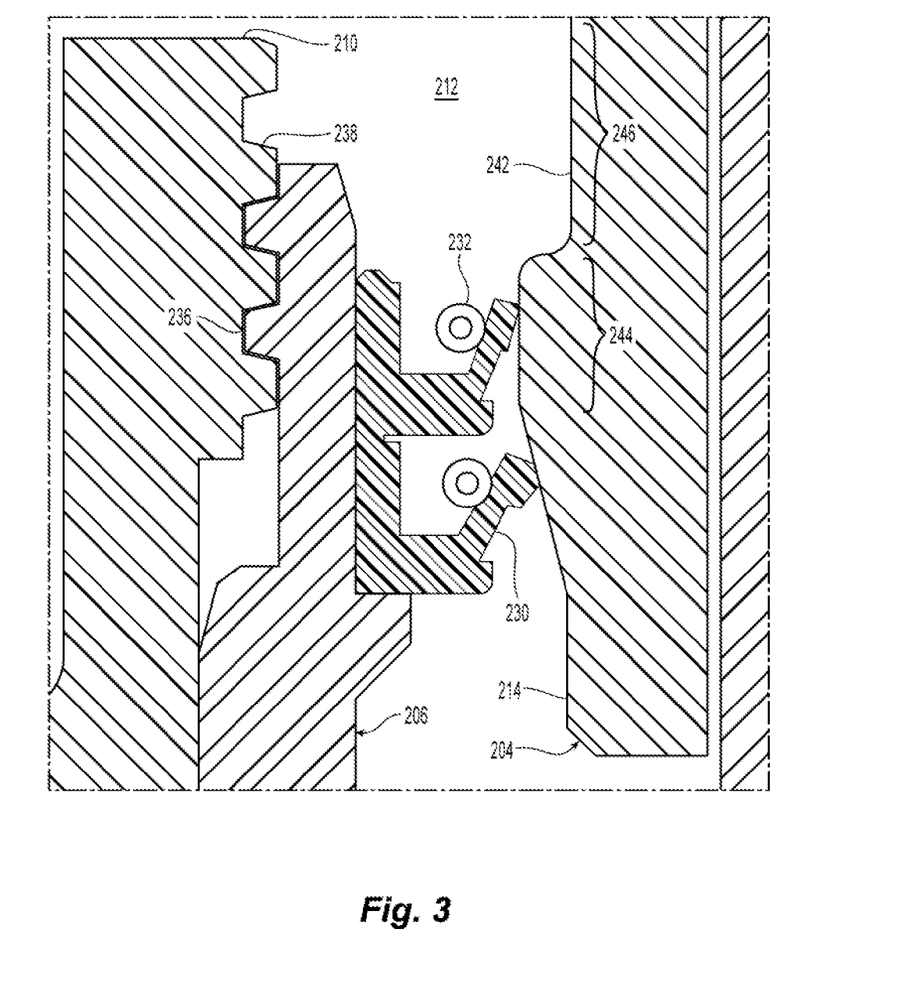
FIG. 3 is a sectional view of an apparatus according to one or more aspects of the present disclosure.

FIG. 3 shows the same cross-sectional image as FIG. 2-1, but with the seal carrier 206 displaced from the position in FIG. 2-1. Accordingly, in this example, the seal carrier 206 has been threaded downwardly moving both the originally engaging seal 230 and the redundant seal 232 axially along the wear ring 214. The redundant seal 232 is now engaged with the sealing region 244 of the wear ring 214. The originally engaging seal 230 in this exemplary embodiment, has moved onto a tapered region of the wear ring 214 below the sealing region 244. Moving the originally engaging seal 230 away from the sealing region and onto a region of smaller diameter (or out of contact with the wear ring altogether) may reduce the likelihood of heat build-up that may occur as a result of two seals in close proximity in a sealing engagement on the same shaft, which could adversely affect the seal life by increasing degradation.

In this example, although the redundant seal 232 is sealingly engaged with the sealing region 244 of the wear ring 214, the sealing location is different than the sealing location of the originally engaging seal 230 in the sealing region 244 shown in FIG. 2-1. That is, the redundant seal 232 is sealingly engaged at a location in the sealing region 244 of the wear ring 214 that was originally inside of the enclosed chamber 212 when the redundant seal 232 was not sealingly engaged with the wear ring 214. In another embodiment, the redundant seal 232 engages the wear ring 214 in the same location that the originally engaging seal 230 sealingly engaged the wear ring 214. In the example shown, the amount of displacement of the originally engaging seal 230 and the redundant seal 232 may be controlled by increasing or decreasing the number of rotations of the seal carrier 206.

In one embodiment, the rotary shaft 204 does not include a wear ring 214, and the originally engaging seal 230 and the redundant seal 232 may seal directly against the main shaft 216 or another element of a shaft. Furthermore, although only two seals are shown in the figures, other embodiments, include additional seals. It should be understood that any number of redundant seals may be included as needed to provide enough seals for the expected operational life of the associated equipment without requiring removal of any worn seals or installation of new seals, or both. One embodiment includes three seals. Another embodiment includes four seals. However, an even greater number of seals may be used. These seals may be stacked as shown in FIG. 2, or alternatively, may be otherwise arranged on their own independent seal seat. Accordingly, as one seal wears, the next seal in line may be displaced to engage the rotary shaft 204 and protect and seal the top drive 140.

In the example shown, the originally engaging seal 230 and the redundant seal 232 are shown as rotary seals, each having a sealing lip that projects to engage the rotary shaft 204. However, other seal types may be used as would be apparent to one of ordinary skill in the art. In one embodiment, the seals are formed of one or more elastomeric materials, which can be molded to the seal carrier. In another embodiment, the seal carrier and the plurality of ring-shaped seals are integrally formed from one or more elastomeric materials.

Furthermore, while the embodiment in FIGS. 2 and 3 discloses a seal carrier 206 that may be axially moved along the rotary shaft 204, other embodiments include a fixed seal carrier 206 with an axially displaceable shaft 204 or wear ring 214. In addition, while the embodiments disclosed in FIGS. 2 and 3 have a seal carrier 206 that moves downwardly so that the redundant seal 232 engages the wear ring 214, other embodiments are formed so that the seal carrier 206 moves upwardly to engage the wear ring 214. In such an example, the redundant seal 232 may engage the wear ring 214 when the seal carrier 206 is moved upward. In another example, the redundant seal 232 is engaged with the wear ring 214 in the first position and the originally engaging seal 230 engages the wear ring 214 when the seal carrier 206 is moved upward or downward along the rotary shaft 204.

Figures 4, 41:
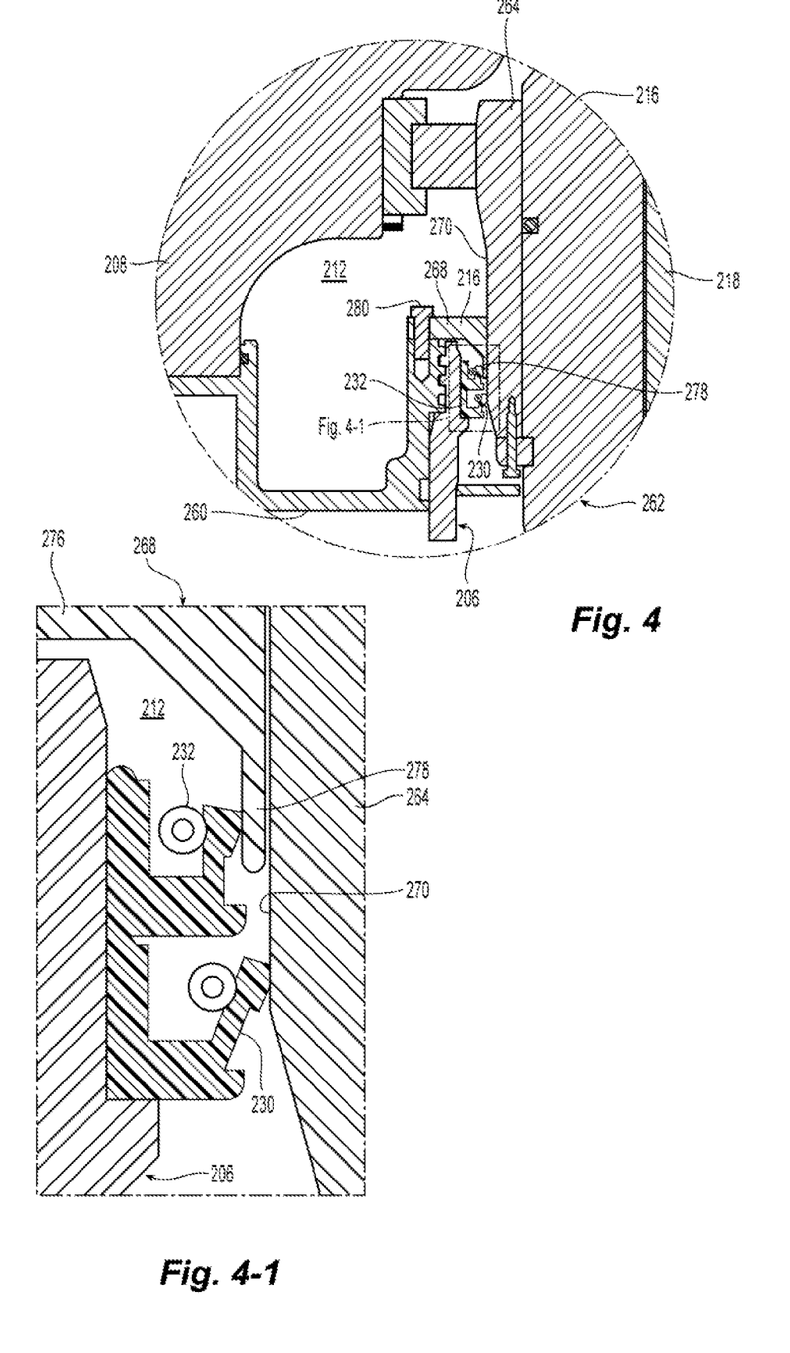

FIG. 4 shows another exemplary embodiment of an apparatus with a stored redundant seal that can be maintained in a reserve position until a desired point in time. In FIG. 4, the apparatus maintains the redundant seal 232 in a storage position by the use of an intervening spacer that separates the redundant seal 232 from the rotary shaft 204 until desired. The apparatus in FIG. 4 includes many of the same features as the apparatus in FIGS. 2 and 3, and therefore, portions of the description above also apply to the embodiment in FIG. 4. The differences however, will be described in greater detail.

The apparatus in FIG. 4 includes the seal carrier 206 with the originally engaging seal 230 and with the redundant seal 232. It also includes a housing lower body 260 that differs from the housing lower body 210 described above, a rotary shaft 262 having a wear ring 264 with a different profile than the wear ring 214 of FIGS. 2 and 3, and includes an intervening spacer 268 configured to maintain the redundant seal 232 in a storage position the chamber 212 until desired. The wear ring 264 of the rotary shaft 262 in this example has a sealingly engageable outer surface 270 that has a substantially constant diameter over the length aligned with the originally engaging seal 230 and the redundant seal 232. Other embodiments have a diameter outside the sealing zone that varies along the axial length.

The intervening spacer 268 includes a base 276 and a spacer edge 278. The base 276 is rotationally fixed relative to the redundant seal 232 during operation of the top drive. In this example, the base 276 is configured to attach to the housing lower body 260. In this example, the housing lower body 260 is arranged to accommodate fixation to the base 276 by fastener disclosed as a bolt 280. In some embodiments, the base 276 is attached to the housing lower body 260, while in other embodiments, it is integral with or formed with the housing lower body 260. The base 276 may be connected to the housing lower body 260 in any suitable manner including the bolt 280 as shown in FIG. 4, a weld, or any other suitable fastener or fastening method that would be apparent to one of ordinary skill in the art. The spacer edge 278 extends from the base 276 and forms a radial ring spaced from the outer surface 270 of the wear ring 264 of the rotary shaft 262.

FIG. 4-1 shows the spacer edge 278 of the intervening spacer 268 cooperating with the redundant seal 232 in greater detail. In FIG. 4-1, the intervening spacer 268 is disposed between the redundant seal 232 and the rotary shaft 204. Accordingly, the redundant seal 232 is maintained in a non-wearing condition during rotation of the rotary shaft 262. As can be seen the originally engaging seal 230 is in sealing engagement with the rotary shaft 262.

After a period of time or when the originally engaging seal 230 becomes worn, the seal carrier 206 may be displaced in the manner discussed above causing both the originally engaging seal 230 and the redundant seal 232 to move axially along with the rotary shaft 262 in the manner discussed above. In so doing, the redundant seal 232 moves beyond the spacer edge 278 and comes into engaging contact with the wear ring 264 of the rotary shaft 262. The redundant seal 232 may then perform the role of inhibiting or preventing leakage from the enclosed chamber 212, and may help inhibit or prevent introduction of contaminates in place of the now-used originally engaging seal 230.

Figure 5:
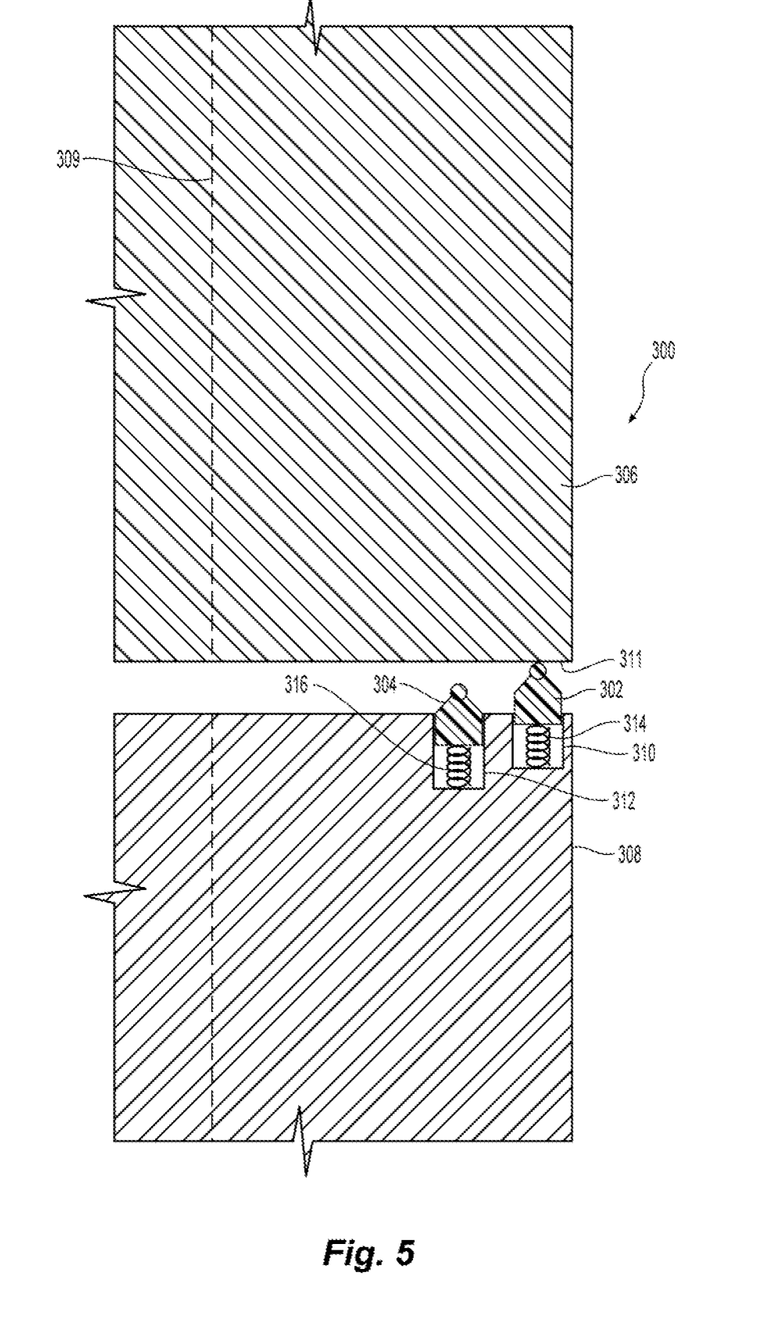
FIG. 5 is a sectional view of an apparatus according to one or more aspects of the present disclosure.

FIG. 5 shows yet another embodiment of an apparatus 300 having an originally engaging seal 302 and a redundant seal 304. In this embodiment, the originally engaging seal 302 and the redundant seal 304 sealing engage an end of a rotary shaft 306. This embodiment discloses a rotary shaft 306 for an apparatus 300 with a seal carrier 308 disposed along an end 311 of the rotary shaft 306. Here, the rotary shaft 306 has a rotational axis 309. The seal carrier 308 carries the originally engaging seal 302 and the redundant seal 304. In the exemplary embodiment shown, the seal carrier 308 is configured with different seats 310, 312 respectively for the originally engaging seal 302 and the redundant seal 304. The seat 310 for the originally engaging seal 302 includes a first depth, and as such, the originally engaging seal 302 projects outwardly to sealingly engage the rotary shaft 306. In this embodiment, the originally engaging seal 302 is biased with a biasing member 314 toward the rotary shaft 306.

The redundant seal 304 is maintained in the seat 312. The redundant seal 304 is arranged in an initial operating position to be disposed at a location spaced apart from the rotary shaft 306, such that the redundant seal 304 is not subject to wear from the rotary shaft 306 until positioned to provide sealing engagement. In this embodiment, the redundant seal 304 is also biased toward the rotary shaft 306, but is maintained in a spaced condition from the rotary shaft 306 during a first operation condition. As described above, the redundant seal is maintained in a protected or enclosed region, which may be isolated in part or entirely by the originally engaging seal.

After a period of time, or after the originally engaging seal 302 has began to show signs of wear (e.g., through detection of leaking), the seal carrier 308 may be axially displaced relative to the end 311 of the rotary shaft 306. By moving the seal carrier 308 toward the rotary shaft 306, the originally engaging seal 302 compresses against the biasing member 314 in the seat 310 and the redundant seal 304 comes into contact with the rotary shaft 306 in a sealing engagement. Accordingly, the redundant seal 304 maintains the seal even as the originally engaging seal 302 continues to wear. Some embodiments use mechanical face seals, such as carbide rings spring loaded against each other to form the seal.

In the embodiments described above, the seal carrier may be moved up or down relative to the rotary shaft 204, 306 using any displacement element or manner known in the art. In the example described above, the seal carrier 206 includes threads as displacement elements that engage the housing lower body 210 and may be axially displaced through the act of threading the seal carrier 206 on the threads. Some displacement elements, such as the threads disclosed above provide rotational actuation. Other displacement elements provide linear actuation. Mechanical fasteners may be used to limit, permit, or regulate the rotational or linear actuation. Some examples of displacement elements that provide rotational actuation include the threads described above, step-down threads, notches, slanted slopes, for example. In one example, the seal carrier includes a receiving hole therein that receives a rod acting as a lever or clocking tool or grip that may aid in rotating the seal carrier. The seal carrier may be arranged to travel the distance necessary to engage the redundant seal by having displacement elements that are angled to displace the redundant seal to the sealing position with a quarter turn, half turn, or other distance. Examples of mechanical fasteners that enable rotation, linear movement or stop limits or gauges may include holes, notches, or teeth machined into the seal carrier that may be used to grip or otherwise engage the housing. Mechanical stops may prevent over rotation or under rotation. Examples of travel limiters may include, for example, the clocking tool or grip, a wrench with a grasp latch, a wrench with a sliding latch, a snap pin, a manual pin, a bracket on the seal carrier, pins that align with an engage the seal carrier, set screws, alignment pins, set screws, latches, shoulders, and any other device that mechanically stops rotation.

Examples of linear actuation methods include, for example, insertion of grease (or other suitable hydraulic or pneumatic fluid(s)) into a fluid cavity or an internal hydraulic cavity, for example. Other methods of linear actuation include gravity, such as by removing a retention force such as a pin. Fasteners may include alignment indication pins, shear pins, impact systems such as manual force applied with a hammer or pry bar. A mechanical stop may limit the travel distance in at least one direction. The mechanical stop may be a shoulder or other physical interference that prevents travel beyond a particular location. Stop limits may include circular slider, a double slider link, a clevis-rung ladder bracket, alignment pins, set screws, latches, shoulders, and any other device that mechanically stops rotation. The displacement elements described both for rotation and for linear actuation are examples only, and additional displacement elements, and additional travel limiters are contemplated and considered to be within the scope of this disclosure.

In use, the originally engaging seal and a redundant seal are secured in a seal carrier. The seal carrier may include a single seat and the seals may be stacked or may include a plurality of seats and the seals may be disposed in their own separate seats. The seal carrier may be assembled into a top drive system having a rotating shaft so that the shaft is sealingly engaged by the first seal but not by the redundant seal. Assembling the seal carrier into the top drive may include inserting the rotary shaft through the originally engaging seal to sealingly engage about the rotary shaft and may include sliding the rotary shaft through both the originally engaging seal and the redundant seal until the originally engaging seal is sealingly engaged with the rotary shaft along a sealing region and the redundant seal aligns with a depression or a region of smaller diameter than the sealing region. The seals are then in condition that allows operation of the top drive with an originally engaging seal about the rotary shaft and the other redundant seal held in a reserve position. In another embodiment, the redundant seal is placed over the intervening spacer and the rotating shaft is introduced through the spacer so that the first seal is sealingly engaged on the shaft and the redundant seal is spaced from the shaft. Assembling the seal carrier onto the top drive also may include arranging the redundant seal to be inside the protected region of the top drive until it is moved into a sealing engagement position in contact with a portion of a wear ring or wear zone on a shaft.

During use, the rotary shaft may be driven by the mechanics of the top drive to drive the quill of the drill string and to ultimately drive the drill string. The originally engaging seal may seal against the rotary shaft by engaging a wear ring disposed about the main shaft. The seal isolates a protected or enclosed region that may contain a fluid, such as a lubricating liquid or gas. The redundant seal is disposed in a position where it is spaced apart from or not in sealing engagement with the rotary shaft.

The top drive may be operated in this condition for a period of time. In one embodiment, the period of time may be dictated by a maintenance schedule recommending a new seal engagement at a particular time. For example, the schedule may recommend applying a new seal, such as the redundant seal, after a period of time less than the operational life of the machine. In one example, the schedule may recommend applying a new seal after at least 300 hours of operation. Other embodiments, recommend applying a new seal after 500 hours of operation, 1000 hours of operation, 1500 hours of operation. Some embodiments, recommend applying a new seal after 3 years of operation. Naturally, other periods of time may be used in a maintenance schedule, which will depend on the type of equipment, continuous use compared to use with inactive intervals, the fluids retained, the rotational speeds typically used, and other such factors. In another embodiment, the period of time may be dictated by the condition of the originally engaging seal. For example after a period of time, the originally engaging seal may display signs of wear or of failure, which may be detected, e.g., through routine maintenance on the equipment for other reasons or through leakage of the fluid that should be retained in the enclosed chamber. In these situations, the operator may determine that the redundant seal should be employed to sealingly engage the shaft to ensure continued operation of the top drive.

After operating the top drive and making a determination to engage the redundant seal, the redundant seal may be moved relative to the rotary shaft to create a sealing engagement with the rotary shaft. Moving the redundant seal relative to the rotary shaft to create a sealing engagement may include moving the redundant seal itself so that it displaces, moving the rotary shaft so that the redundant seal displaces relative to the rotary shaft, and moving the intervening spacer so that the redundant seal can elastically displace and engage the rotary shaft, as well as any combination of these. The redundant seal may take the place of the originally engaging seal by isolating the enclosed or protected chamber from a separate environment, such as an outside environment. The redundant seal may engage the rotary shaft along an axially extending sealing region of the shaft that may be same sealing region that was engaged by the originally engaging seal. Even in the same sealing region, the redundant seal may engage a location within the sealing region that is axially offset from the location engaged by the originally engaging seal. In some embodiments, the redundant seal engages the same, overlapping location within the sealing region engaged by the originally engaging seal.

In one embodiment, when the redundant seal is moved from its non-engaged position to the sealingly engaged position, the originally engaging seal is also displaced relative to the rotary shaft. For example, the originally engaging seal may be moved to a region of a smaller diameter, such as a tapering diameter to reduce or eliminate the sealing pressure applied by the seal around the rotary shaft. Rotating the originally engaging seal adjacent the now sealably engaged redundant seal may generate some level of heat on the rotary shaft, which may increase the degradation of the redundant seal. Therefore it may be advantageous to displace the originally engaging seal to a location that will allow it to provide only small levels or no additional heat due to its continued engagement with the rotary shaft. Other embodiments however, permit the originally engaged seal to continue to seal adjacent the now sealingly engaged redundant seal.

While the system and methods described above relate a top drive system for drilling a wellbore, other applications of the redundant seal system and methods disclosed herein are contemplated. For example, the use of a redundant seal in the manner described may find utility in any machinery having a sealed rotary shaft where the machinery life is greater than the seal life.

In addition, while the redundant seal is disclosed as being initially out of contact with the wear ring, in some embodiments, the redundant seal is disposed in a position where it only slightly engages a tapered surface. This minimizes wear on the redundant seal while still keeping it in mild contact with the wear ring or shaft. Translation brings the redundant seal into full engagement when needed.

In addition, some embodiments include a primary seal as a radial seal with a secondary or redundant seal as an axial seal. Such embodiments represent a combination between the configurations described in FIGS. 2 and 5. In addition, some embodiments also include a radially outwardly extending seal, with the seals and spacer mounted on the shaft. Other embodiments include the redundant seal disposed outside the sump area and outside of the protected area.

In view of all of the above and the figures, one of ordinary skill in the art will readily recognize that the present disclosure introduces an apparatus including a rotatable shaft having a shaft surface and a first seal disposed in a sealing engagement with the shaft surface. At least a second seal is disposed in a first position relative to the rotatable shaft where the second seal is not in sealing engagement with the shaft surface and is movable to a second position relative to the rotatable shaft where the second seal is in sealing engagement with the shaft surface. In an aspect, the apparatus further includes a mover to move one of the second seal and the rotatable shaft relative to each other to move the second seal to the second position. In an aspect, the first seal fluidly isolates an enclosed region of the apparatus from an environment of the apparatus, and wherein the second seal is disposed in the enclosed region when in the first position. In an aspect, the enclosed region includes a gaseous or liquid fluid at least intermittently in contact with the first seal. In an aspect, each seal includes a rotary seal having a lip sealingly engagable about the shaft surface. In an aspect, the rotatable shaft is operably coupled to a top drive. In an aspect, the rotatable shaft is operably coupled to a power swivel. In an aspect, the mover includes a threaded member to move the second seal longitudinally relative to the rotatable shaft in response to a rotational input. In an aspect, the mover is associated with each seal. In an aspect, the mover includes a seal carrier axially moveable relative to the rotatable shaft to displace the second seal towards the second position. In an aspect, the seal carrier includes a thread such that relative rotation between the seal carrier and the apparatus threadably advances the second seal towards the second position. In an aspect, the seal carrier includes a seat for both the first seal and the second seal. In an aspect, the rotatable shaft includes a first region having a first diameter and a second region axially displaced therefrom and having a second diameter different than the first diameter, with the first seal being sealingly engaged with the rotatable shaft at the first region and the second seal being adjacent to but not in sealing engagement with the second region when the second seal is in the first position. In an aspect, the second seal engages the first region when the second seal is in the second position, such that the first and second seals engage different locations on the first region. In an aspect, the first seal is sealingly engaged with a radially-extending portion of the shaft surface when the second seal is in the first position, and wherein the second seal is sealingly engaged with the radially-extending portion of the shaft surface when the second seal is in the second position. In an aspect, the first and the second seals have sealing interfaces of different diameters. In an aspect, the apparatus includes a biasing member biasing the second seal towards the first position. In an aspect, the apparatus includes an intervening spacer selectively disposed between the second seal and the shaft surface, wherein relative motion of the intervening spacer and the second seal moves the second seal towards the second position. In an aspect, the intervening spacer is a sleeve disposed about the rotatable shaft. In an aspect, the intervening spacer contacts a radially-inward portion of the second seal when the second seal is in the first position. In an aspect, the second seal includes an elastomeric material biased towards the second position. In an aspect, the first seal fluidly isolates an enclosed region of the apparatus from an environment of the apparatus, and wherein the second seal and at least a portion of the intervening sleeve are disposed in the enclosed region when the second seal is in the second position. In an aspect, the enclosed region contains a gaseous or liquid fluid at least intermittently in contact with the first seal. In an aspect, the rotatable shaft includes a wear ring sealingly engaged by the first seal in the first position and the second seal in the second position. In an aspect, the mover includes at least one of: one or more threads, a stepped slot, a pin and stop, a slant slot, a spring loaded latch, a linear actuation system. In one aspect, the linear actuation system includes a fluid cavity. In one aspect, the linear actuation system includes a hydraulic system.

The present disclosure also introduces an apparatus, including a shaft having a shaft surface and a surrounding structure disposed around a circumference of the shaft. One of the shaft and the surrounding structure is rotatable relative to the other. The apparatus also includes a first seal and a second seal carried by one of the shaft and the surrounding structure and axially displaceable between a first position and a second position relative to the shaft surface. The first seal sealingly engages the shaft surface when the second seal is in the first position. The second seal is not engaged with the shaft and the surrounding structure when in the first position. The second seal sealingly engages the shaft and the surrounding structure when the second seal is in the second position. In an aspect, the surrounding structure is a seal carrier, and wherein the second seal is carried by the seal carrier. In an aspect, the second seal is directly or indirectly fixed to the shaft. In an aspect, the first seal separates a protected area from an unprotected area, and wherein the second seal is disposed in the protected area when in the first position. In an aspect, the apparatus includes a gaseous or liquid fluid in the protected area.

The present disclosure also introduces a method, including: rotating, relative to a first seal, a shaft sealingly engaged by the first seal, and replacing the first seal with a second seal by axially displacing the second seal from a first position to a second position, wherein the second seal sealingly engages the shaft when in the second position but does not sealingly engage the shaft when in the first position. In an aspect, the first seal fluidly isolates an enclosed region from a surrounding environment when the second seal is in the first position, and wherein the second seal fluidly isolates the enclosed region from the surrounding environment when the second seal is in the second position. In an aspect, the first seal partially defines the enclosed region when the second seal is in the first position, and wherein the second seal partially defines the enclosed region when the second seal is in the second position. In an aspect, the second seal is disposed within the enclosed region when the second seal is in the first position, and wherein the first seal is disposed outside the enclosed region when the second seal is in the second position. In an aspect, axially displacing the second seal to the second position includes moving the second seal relative to the shaft. In an aspect, axially displacing the second seal to the second position includes moving the shaft relative to the second seal. In an aspect, axially displacing the second seal to the second position includes removing a member from between the second seal and the shaft. In an aspect, the first seal engages the shaft at a sealing region when the second seal is in the first position, and wherein the second seal engages the shaft at an adjacent sealing region when the second seal is in the second position. In an aspect, the first seal engages the shaft at a sealing region when the second seal is in the first position, and wherein the second seal engages the shaft at the sealing region when the second seal is in the second position. In an aspect, the method includes evaluating wear induced on the first seal, and wherein replacing the first seal with the second seal is based on a comparison of the evaluated wear and a wear threshold. In an aspect, replacing the first seal with the second seal includes replacing the first seal with the second seal after inducing wear on the first seal for a period of at least about 300 hours. In an aspect, replacing the first seal with the second seal includes axially displacing the first and second seals relative to the shaft.

The present disclosure also introduces an apparatus including a rotatable shaft having at least one substantially cylindrical surface, and a plurality of seals axially movable relative to the rotatable shaft to each exclusively sealingly engage the cylindrical surface in a corresponding one of a plurality of axial positions of the plurality of seals. In an aspect, the plurality of seals includes a first seal and a second seal substantially similar to but axially spaced from the first seal, and wherein the plurality of axial positions includes: a first position in which the first seal sealingly engages the cylindrical surface but the second seal does not sealingly engage the cylindrical surface; and a second position in which the second seal sealingly engages the cylindrical surface but the first seal does not sealingly engage the cylindrical surface. In an aspect, the plurality of seals includes a first seal, a second seal substantially similar to but axially spaced from the first seal, and a third seal substantially similar to but axially spaced from the first and second seals, and wherein the plurality of axial positions includes: a first position in which the first seal sealingly engages the cylindrical surface but the second and third seals do not sealingly engage the cylindrical surface; a second position in which the second seal sealingly engages the cylindrical surface but the first and third seals do not sealingly engage the cylindrical surface; and a third position in which the third seal sealingly engages the cylindrical surface but the first and second seals do not sealingly engage the cylindrical surface.

The present disclosure also introduces a method, including securing a first seal and second seal in a seal carrier, and assembling the seal carrier into a top drive system having a rotating shaft, whereby the rotating shaft is sealingly engaged by the first seal but not by the second seal. In an aspect, the method includes axially moving the seal carrier relative to the rotary shaft such that the rotating shaft is sealingly engaged by the second seal but not by the first seal. In an aspect, assembling the seal carrier into the top drive system includes arranging the second seal within an enclosed region of the top drive system at least partially defined by the first seal and the rotating shaft, and wherein the first seal fluidly isolates the enclosed region from a surrounding environment.

The present disclosure also introduces an apparatus, including a carrier and a mechanical interface to a top drive system by which the carrier is assembled into the top drive system such that rotation of the carrier relative to the top drive system axially displaces the carrier along an axis of the rotation. The apparatus also includes a plurality of ring-shaped fluid seals each extending from the carrier. In an aspect, each of the plurality of ring-shaped seals sealingly engage a rotating shaft of the top drive system one at a time based on the axial displacement of the carrier. In an aspect, a radially-intermediate portion of each of the plurality of ring-shaped seals is hollow, and wherein each of the plurality of ring-shaped seals includes a lip extending from the hollow radially-intermediate portion. In an aspect, the plurality of ring-shaped seals includes an elastomeric material molded to the carrier. In an aspect, the carrier and the plurality of ring-shaped seals are integrally formed from an elastomeric material.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. An apparatus, comprising:
a main body structure having a threaded inwardly facing portion;
a rotatable shaft having a shaft surface;
a mover having a threaded outwardly facing portion threadedly coupled to the threaded inwardly facing portion of the main body structure, the mover comprising:
a first seal disposed in a sealing engagement with the shaft surface; and
at least a second seal disposed in a first position relative to the rotatable shaft where the second seal is not in sealing engagement with the shaft surface, one of the mover and main body structure being rotatable relative to the other of the mover and main body structure such that the mover is axially movable along the rotatable shaft from the first position to a second position relative to the rotatable shaft where the second seal is in sealing engagement with the shaft surface.

2. The apparatus of claim 1 wherein the mover is configured to move one of the second seal and the rotatable shaft relative to each other to move the second seal to the second position.

3. The apparatus of claim 2 wherein the mover comprises a threaded member to move the second seal longitudinally relative to the rotatable shaft in response to a rotational input.

4. The apparatus of claim 2 wherein the mover is associated with each seal.

5. The apparatus of claim 2 wherein the mover comprises a seal carrier axially moveable relative to the rotatable shaft to displace the second seal towards the second position.

6. The apparatus of claim 5 wherein the seal carrier comprises a thread such that relative rotation between the seal carrier and the apparatus threadably advances the second seal towards the second position.

7. The apparatus of claim 5 wherein the seal carrier comprises a seat for both the first seal and the second seal.

8. The apparatus of claim 2 wherein the mover comprises a stepped slot.

9. The apparatus of claim 2 wherein the mover comprises a slant slot.

10. The apparatus of claim 2 wherein the mover comprises a spring loaded latch.

11. The apparatus of claim 2 wherein the mover comprises a linear actuation system.

12. The apparatus of claim 11 wherein the linear actuation system comprises a fluid cavity.

13. The apparatus of claim 11 wherein the linear actuation system comprises a hydraulic system.

14. The apparatus of claim 1 wherein the first seal fluidly isolates an enclosed region of the apparatus from an environment of the apparatus, and wherein the second seal is disposed in the enclosed region when in the first position.

15. The apparatus of claim 14 wherein the enclosed region comprises a gaseous or liquid fluid at least intermittently in contact with the first seal.

16. The apparatus of claim 1 wherein each seal comprises a rotary seal having a lip sealingly engagable about the shaft surface.

17. The apparatus of claim 1 wherein the rotatable shaft is operably coupled to a top drive.

18. The apparatus of claim 1 wherein the rotatable shaft is operably coupled to a power swivel.

19. The apparatus of claim 1 wherein the rotatable shaft comprises a first region having a first diameter and a second region axially displaced therefrom and having a second diameter different than the first diameter, with the first seal being sealingly engaged with the rotatable shaft at the first region and the second seal being adjacent to but not in sealing engagement with the second region when the second seal is in the first position.

20. The apparatus of claim 19 wherein the second seal engages the first region when the second seal is in the second position, such that the first and second seals engage different locations on the first region.

21. The apparatus of claim 1 wherein the first seal is sealingly engaged with a radially-extending portion of the shaft surface when the second seal is in the first position, and wherein the second seal is sealingly engaged with the radially-extending portion of the shaft surface when the second seal is in the second position.

22. The apparatus of claim 1 wherein the first and the second seals have sealing interfaces of different diameters.

23. The apparatus of claim 1 comprising a biasing member biasing the second seal towards the first position.

24. The apparatus of claim 1 further comprising an intervening spacer selectively disposed between the second seal and the shaft surface, wherein relative motion of the intervening spacer and the second seal moves the second seal towards the second position.

25. The apparatus of claim 24 wherein the intervening spacer is a sleeve disposed about the rotatable shaft.

26. The apparatus of claim 24 wherein the intervening spacer contacts a radially-inward portion of the second seal when the second seal is in the first position.

27. The apparatus of claim 24 wherein the second seal comprises an elastomeric material biased towards the second position.

28. The apparatus of claim 24 wherein the first seal fluidly isolates an enclosed region of the apparatus from an environment of the apparatus, and wherein the second seal and at least a portion of the intervening sleeve are disposed in the enclosed region when the second seal is in the second position.

29. The apparatus of claim 28 wherein the enclosed region contains a gaseous or liquid fluid at least intermittently in contact with the first seal.

30. The apparatus of claim 1 wherein the rotatable shaft comprises a wear ring sealingly engaged by the first seal in the first position and the second seal in the second position.

31. An apparatus, comprising:
a top drive configured to rotate a drill string to create a wellbore, the top drive comprising:
a shaft having a shaft surface, the shaft being rotatable to rotate the drill string to create the wellbore;
a surrounding structure disposed around a circumference of the shaft, wherein one of the shaft and the surrounding structure is rotatable relative to the other, the surrounding structure having a threaded portion about the shaft;
a seal carrier threaded to the threaded portion of the surrounding structure, the seal carrier being threadingly moveable in an axial direction along a portion of the shaft, the seal carrier comprising:
a first seal carried by the seal carrier and in sealing engagement with the shaft surface; and
a second seal carried by the seal carrier and axially displaceable by the seal carrier when the seal carrier is threadingly moved axially along the portion of the shaft, the second seal being carried by the seal carrier between a first position and a second position relative to the shaft surface, wherein the first seal sealingly engages the shaft surface when the second seal is in the first position, wherein the second seal is not engaged with the shaft and the surrounding structure when in the first position, and wherein the second seal sealingly engages the shaft and the surrounding structure when the second seal is in the second position.

32. The apparatus of claim 31 wherein the second seal is directly or indirectly fixed to the shaft.

33. The apparatus of claim 31 wherein the first seal separates a protected area from an unprotected area, and wherein the second seal is disposed in the protected area when in the first position.

34. The apparatus of claim 33 further comprising a gaseous or liquid fluid in the protected area.

35. The apparatus of claim 31, wherein the surrounding structure is a housing of the top drive and encloses a lubricating chamber of the top drive.

36. An apparatus, comprising:
a surrounding structure having a first threaded portion;
a rotatable shaft having at least one substantially cylindrical surface, the rotatable shaft being coaxial with and spaced from the first threaded portion;
a seal carrier disposed about the rotatable shaft and comprising a second threaded portion threadedly coupled to the first threaded portion, the seal carrier being arranged to threadedly displace relative to the first threaded portion along the axis of the shaft; and
a plurality of seals carried on the seal carrier and axially movable with the seal carrier relative to the rotatable shaft to each exclusively sealingly engage the cylindrical surface in a corresponding one of a plurality of axial positions of the plurality of seals.

37. The apparatus of claim 36 wherein the plurality of seals comprises a first seal and a second seal substantially similar to but axially spaced from the first seal, and wherein the plurality of axial positions includes:
a first position in which the first seal sealingly engages the cylindrical surface but the second seal does not sealingly engage the cylindrical surface; and
a second position in which the second seal sealingly engages the cylindrical surface but the first seal does not sealingly engage the cylindrical surface.

38. The apparatus of claim 36 wherein the plurality of seals comprises a first seal, a second seal substantially similar to but axially spaced from the first seal, and a third seal substantially similar to but axially spaced from the first and second seals, and wherein the plurality of axial positions includes:
a first position in which the first seal sealingly engages the cylindrical surface but the second and third seals do not sealingly engage the cylindrical surface;
a second position in which the second seal sealingly engages the cylindrical surface but the first and third seals do not sealingly engage the cylindrical surface; and
a third position in which the third seal sealingly engages the cylindrical surface but the first and second seals do not sealingly engage the cylindrical surface.

39. An apparatus, comprising:
a carrier having a first threaded portion;
a mechanical interface to a top drive system by which the carrier is assembled into the top drive system, the mechanical interface having a second threaded portion, the first threaded portion being threadedly engaged with the second threaded portion such that rotation of the carrier relative to the top drive system axially displaces the carrier along an axis of the rotation;
a rotatable shaft having a substantially cylindrical surface, the rotatable shaft having an axis coaxial with an axis formed by the first threaded portion; and
a plurality of ring-shaped fluid seals each extending from the carrier arranged to engage the rotatable shaft.

40. The apparatus of claim 39 wherein each of the plurality of ring-shaped seals sealingly engage a rotating shaft of the top drive system one at a time based on the axial displacement of the carrier.

41. The apparatus of claim 39 wherein a radially-intermediate portion of each of the plurality of ring-shaped seals is hollow, and wherein each of the plurality of ring-shaped seals comprises a lip extending from the hollow radially-intermediate portion.

42. The apparatus of claim 39 wherein the plurality of ring-shaped seals comprises an elastomeric material molded to the carrier.

43. The apparatus of claim 39 wherein the carrier and the plurality of ring-shaped seals are integrally formed from an elastomeric material.

* * * * *